(12) United States Patent
Batur

(10) Patent No.: US 11,126,195 B2
(45) Date of Patent: Sep. 21, 2021

(54) SYSTEM AND METHOD FOR DETECTING OCCLUDED OBJECTS BASED ON IMAGE PROCESSING

(71) Applicant: Faraday & Future Inc., Gardena, CA (US)

(72) Inventor: Aziz Umit Batur, Torrance, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 16/006,532

(22) Filed: Jun. 12, 2018

(65) Prior Publication Data

US 2019/0339706 A1 Nov. 7, 2019

Related U.S. Application Data

(60) Provisional application No. 62/518,524, filed on Jun. 12, 2017.

(51) Int. Cl.
| | |
|---|---|
| *G05D 1/00* | (2006.01) |
| *G05D 1/02* | (2020.01) |
| *G06K 9/00* | (2006.01) |
| *G06K 9/62* | (2006.01) |
| *G06T 7/20* | (2017.01) |
| *G06T 7/136* | (2017.01) |

(52) U.S. Cl.
CPC ......... *G05D 1/0246* (2013.01); *G05D 1/0088* (2013.01); *G06K 9/00791* (2013.01); *G06K 9/6267* (2013.01); *G06T 7/136* (2017.01); *G06T 7/20* (2013.01); *G06K 9/6256* (2013.01); *G06T 2207/10028* (2013.01); *G06T 2207/10044* (2013.01); *G06T 2207/30252* (2013.01)

(58) Field of Classification Search
CPC .. G05D 1/0088; G05D 1/0246; G05D 1/0888; G06K 9/00791; G06K 9/6256; G06K 9/6267; G06T 7/20; G06T 7/136; G06T 2207/10028; G06T 2207/10044; G06T 2207/30252

USPC .......................................................... 701/28

See application file for complete search history.

(56) References Cited

U.S. PATENT DOCUMENTS

| | | | | |
|---|---|---|---|---|
| 6,512,387 | B1 * | 1/2003 | Bohn | G01R 31/70 324/762.02 |
| 9,557,741 | B1 * | 1/2017 | Elie | G06F 16/5854 |
| 2008/0198226 | A1 * | 8/2008 | Imamura | G06K 9/00805 348/148 |
| 2009/0237269 | A1 * | 9/2009 | Okugi | B60R 1/00 340/901 |
| 2010/0322476 | A1 * | 12/2010 | Kanhere | G08G 1/0175 382/103 |

(Continued)

*Primary Examiner* — Joshua E Rodden
(74) *Attorney, Agent, or Firm* — Veros Legal Solutions, LLP

(57) ABSTRACT

The present invention is related to systems and methods for detecting an occluded object based on the shadow of the occluded object. In some examples, a vehicle of the present invention can capture one or more images while operating in an autonomous driving mode, and detecting shadow items within the captured image. In response to detecting a shadow item moving towards the direction of vehicle travel, the vehicle can reduce its speed to avoid a collision, should an occluded object enter the road. The shadow can be detected using image segmentation or a classifier trained using convolutional neural networks or another suitable algorithm, for example.

14 Claims, 4 Drawing Sheets

(56) References Cited

U.S. PATENT DOCUMENTS

| | | | | |
|---|---|---|---|---|
| 2012/0136510 | A1* | 5/2012 | Min | G01S 17/88 |
| | | | | 701/2 |
| 2012/0140988 | A1* | 6/2012 | Takahashi | G06K 9/00805 |
| | | | | 382/103 |
| 2014/0037142 | A1* | 2/2014 | Bhanu | G06K 9/6857 |
| | | | | 382/103 |
| 2014/0180523 | A1* | 6/2014 | Reichel | B62D 15/0285 |
| | | | | 701/23 |
| 2014/0294232 | A1* | 10/2014 | Ju | G06K 9/0063 |
| | | | | 382/103 |
| 2015/0043779 | A1* | 2/2015 | Huntzicker | B60Q 9/008 |
| | | | | 382/104 |
| 2015/0066310 | A1* | 3/2015 | Kim | G05D 3/10 |
| | | | | 701/49 |
| 2016/0253566 | A1* | 9/2016 | Stein | G06T 7/20 |
| | | | | 348/148 |
| 2017/0052537 | A1* | 2/2017 | Salinas | H04L 67/125 |
| 2017/0108876 | A1* | 4/2017 | Mullan | G05D 1/104 |
| 2017/0285646 | A1* | 10/2017 | Connor | G05D 1/0214 |
| 2017/0356993 | A1* | 12/2017 | Lee | G01S 13/865 |
| 2018/0144199 | A1* | 5/2018 | Perez Barrera | G06K 9/4652 |
| 2018/0299900 | A1* | 10/2018 | Bae | G05D 1/0238 |

* cited by examiner

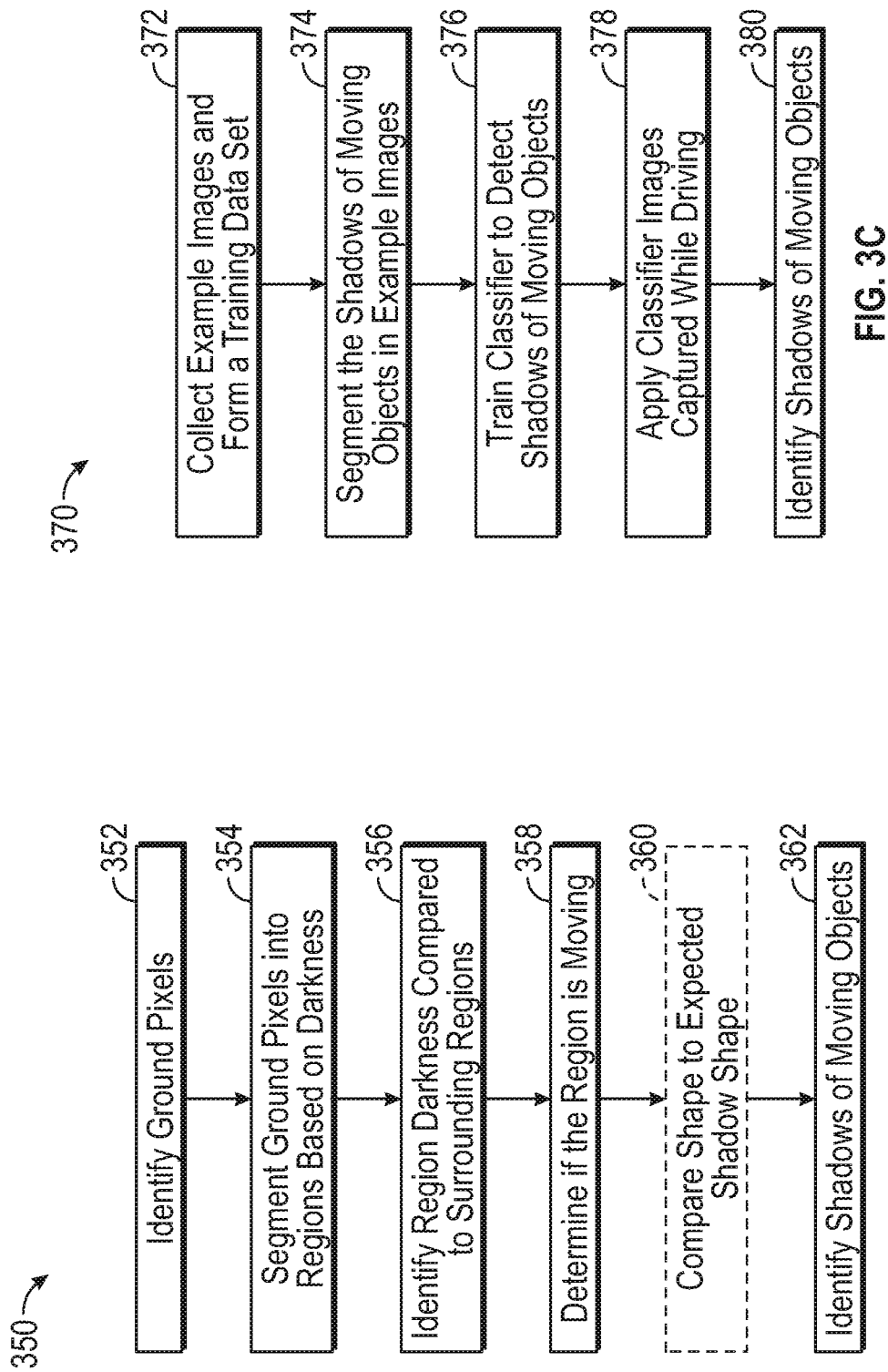

SYSTEM AND METHOD FOR DETECTING OCCLUDED OBJECTS BASED ON IMAGE PROCESSING

CROSS-REFERENCE TO RELATED APPLICATIONS

This application claims the priority benefit of U.S. Provisional Application No. 62/518,524, filed Jun. 12, 2017, the entirety of which is hereby incorporated by reference.

FIELD OF THE DISCLOSURE

This relates to an autonomous vehicle and, more particularly, to a system and method of an autonomous vehicle for detecting an occluded object based on the shadow of the occluded object.

BACKGROUND OF THE DISCLOSURE

Autonomous vehicles, including vehicles operating in a fully autonomous mode, a partially autonomous mode, or a driver assistance mode, can detect objects entering the vehicle's path of travel to avoid a collision. In some examples, however, a pedestrian, animal, or other object can suddenly enter the road, giving the vehicle little time to react. For example, the object can enter the road from behind a parked vehicle or other large object that conceals the object from one or more sensors (e.g., camera(s), radar, LiDAR, range sensors, ultrasonic sensors) of the autonomous vehicle. In these situations, the vehicle may have little time to reduce its speed or come to a complete stop to avoid a collision. It is an object of the present invention to use shadow images to assist with object avoidance during autonomous vehicular navigation.

SUMMARY OF THE DISCLOSURE

This relates to a system and method of an autonomous vehicle for detecting an occluded object based on the shadow of the occluded object. In some examples, the vehicle can operate in a shadow detection mode in based on the vehicle's location. In one embodiment, based on map or location data, the vehicle can determine it is currently in a pedestrian-heavy zone (e.g., parking lot, city, neighborhood, or school zone) and accordingly enter a shadow-detection mode of driving. While driving in the shadow detection mode, the vehicle can capture one or more images (e.g., still images or videos) with a camera, and identify one or more shadows of occluded objects moving towards the vehicle's direction of travel. The shadows can be detected using image segmentation and/or using a classifier trained using convolutional neural networks or a similar algorithm. In response to detecting a shadow moving towards the vehicle's path of travel, the vehicle can reduce its speed to allow more time to react, should an object enter the road, for example. In some examples, the shadow of the occluded object can be detected even when the occluded object itself may not be detected by the sensors (e.g., camera(s), LiDAR, radar, ultrasonic sensors, range sensors).

BRIEF DESCRIPTION OF THE DRAWINGS

FIG. 3B illustrates an exemplary method of identifying a shadow of occluded object using image segmentation according to examples of the disclosure.

FIG. 3C illustrates an exemplary method of identifying a shadow of occluded object using a learning algorithm according to examples of the disclosure.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples. Further, in the context of this disclosure, "autonomous driving" (or the like) can refer to autonomous driving, partially autonomous driving, and/or driver assistance systems.

Figure 1:
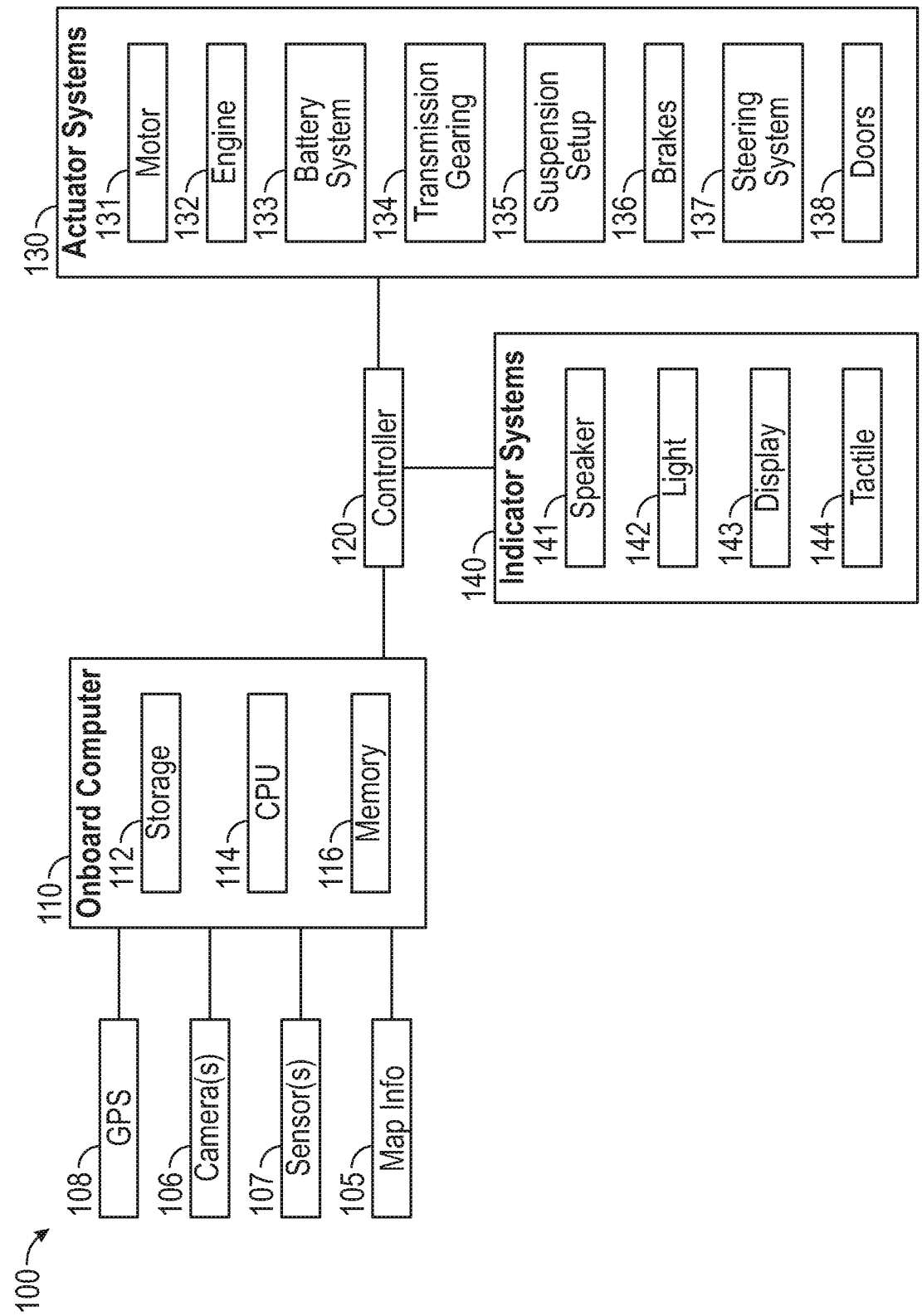
FIG. 1 illustrates an exemplary system block diagram of vehicle control system according to examples of the disclosure.

FIG. 1 illustrates an exemplary system block diagram of vehicle control system 100 according to examples of the disclosure. Vehicle control system 100 can perform any of the methods described below with reference to FIGS. 2-3. System 100 can be incorporated into a vehicle, such as a consumer automobile. Vehicle control system 100 can include one or more cameras 106 capable of capturing image data (e.g., video data) of the vehicle's surroundings, as will be described with reference to FIGS. 2-3. Vehicle control system 100 can also include one or more other sensors 107 (e.g., radar, ultrasonic, LIDAR, other range sensors, etc.) capable of detecting various characteristics of the vehicle's surroundings, and a location system, such as a Global Positioning System (GPS) receiver 108, capable of determining the location of the vehicle. It should be noted that other types of location system can also be used, including cellar, WiFi, or other types of wireless-based location systems. Vehicle control system 100 includes an on-board computer 110 that is operatively coupled to the cameras 106, sensors 107 and GPS receiver 108, and that is capable of receiving the image data from the cameras and/or outputs from the sensors 107 and the GPS receiver 108. The on-board computer 110 can also be capable of receiving map information 105 (e.g., via a wireless and/or interne connection at the vehicle). It is understood by ones of ordinary skill in the art that map data can be matched to location data in map-matching functions. In some examples, the vehicle can select an operation mode based on its location (e.g., a parking lot mode, an urban driving mode, a highway mode, or another location-based operation mode). In accordance with an embodiment of the present invention, in response to determining the vehicle is location is in a pedestrian heavy-zone where pedestrians, pets, or other objects may approach the vehicle's path of travel, the vehicle can enter a shadow detection mode as described below. Examples of pedestrian-heavy zones can include parking lots, school zones, neighborhoods, and cities. In accordance with one embodiment of the invention, the on-board computer 110 can be capable of operating in a fully or partially autonomous driving mode using camera(s) 106 and GPS receiver 108, as described in this disclosure. In some examples, the on-board computer 110 includes storage 112, memory 116, and a processor 114. Processor 114 can perform any of the methods described with reference to FIGS. 2-3. Additionally, storage 112 and/or memory 116 can store data and instructions for performing any of the methods described with reference to FIGS. 2-3. Storage 112 and/or memory 116 can be any non-transitory computer readable storage medium, such as a solid-state drive or a hard disk drive, among other possibilities. The vehicle control system 100 can also include a controller 120 capable of controlling one or more aspects of vehicle operation, such as controlling motion of the vehicle in a fully or partially autonomous driving mode.

In some examples, the vehicle control system 100 can be operatively coupled to (e.g., via controller 120) one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137 and door system 138. The vehicle control system 100 can control, via controller 120, one or more of these actuator systems 130 during vehicle operation; for example, to open or close one or more of the doors of the vehicle using the door actuator system 138, to control the vehicle during fully or partially autonomous driving operations using the motor 131 or engine 132, battery system 133, transmission gearing 134, suspension setup 135, brakes 136 and/or steering system 137, etc. The one or more indicator systems 140 can include, but are not limited to, one or more speakers 141 in the vehicle (e.g., as part of an entertainment system in the vehicle), one or more lights 142 in the vehicle, one or more displays 143 in the vehicle (e.g., as part of a control or entertainment system in the vehicle) and one or more tactile actuators 144 in the vehicle (e.g., as part of a steering wheel or seat in the vehicle). The vehicle control system 100 can control, via controller 120, one or more of these indicator systems 140 to provide indications to a driver of the vehicle of one or more aspects of the fully or partially autonomous driving mode, such as an indication that an occluded object has been detected based on detection of the occluded object's shadow.

Figure 2B:
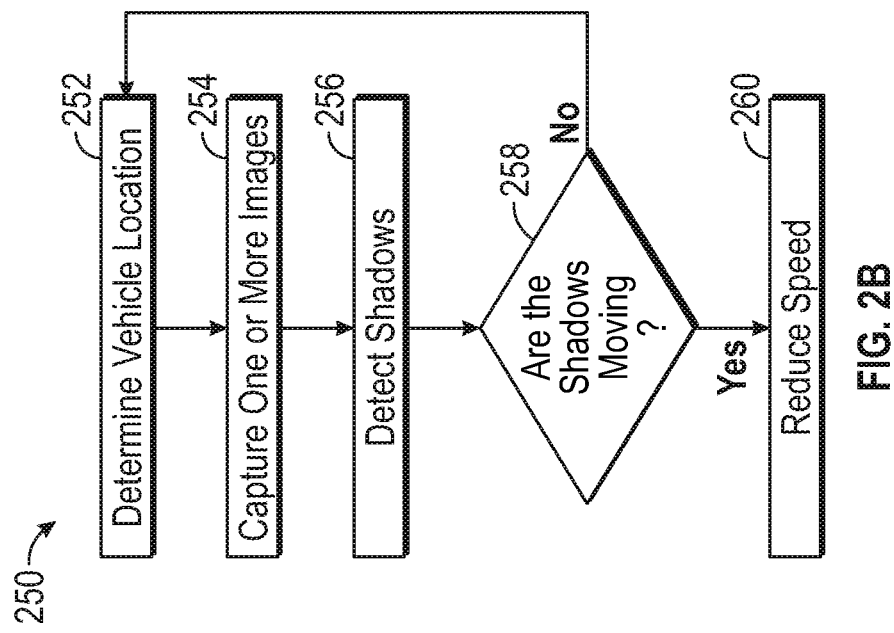
FIG. 2B illustrates an exemplary method of detecting an occluded object during a fully or partially autonomous driving mode of a vehicle according to examples of the disclosure.
Figure 2A:
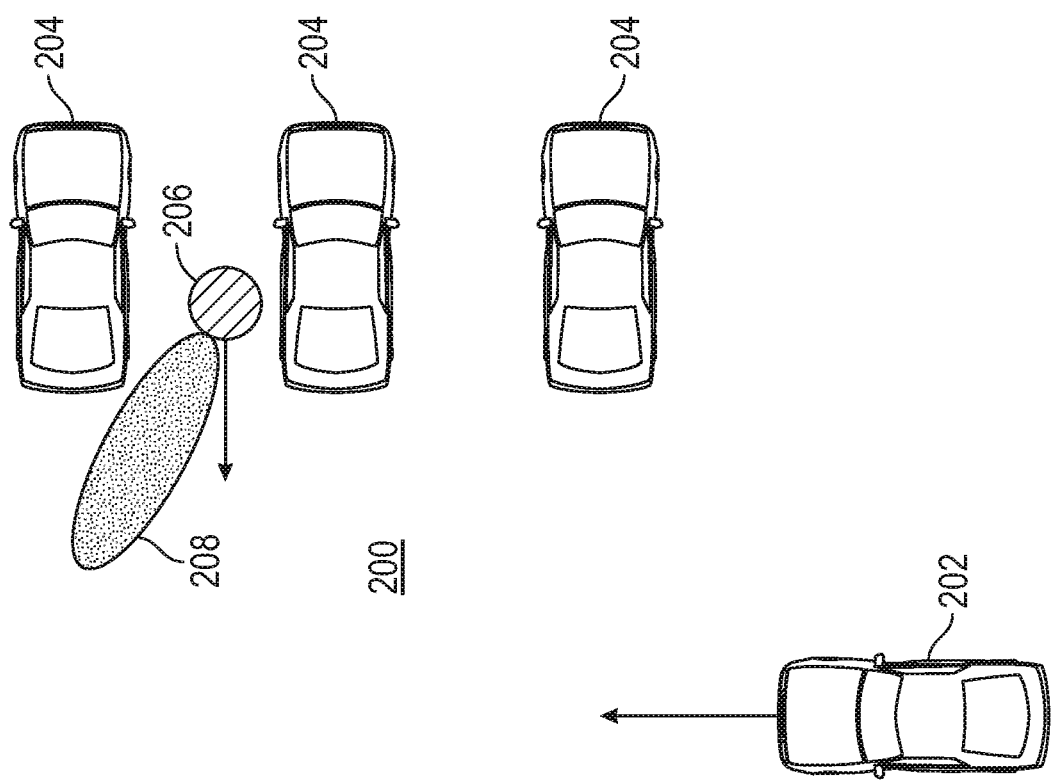
FIG. 2A illustrates an exemplary vehicle detecting an occluded object based on the shadow of the occluded object according to examples of the disclosure.

FIG. 2A illustrates an exemplary vehicle 202 detecting an occluded object 206 based on the shadow 208 of the occluded object according to examples of the disclosure. As an example, a vehicle 202 can be driving in a fully or partially autonomous mode including a shadow detection mode in a parking lot 200 or other pedestrian-heavy zone (e.g., a school zone, a neighborhood, a city). Parking lot 200 can include a plurality of parked vehicles 204 or other stationary objects that can block an occluded object 206 from vehicle 202, for example. The occluded object can be a pedestrian or animal moving from a position between parked cars 204 towards the direction of vehicle 202 travel. In some examples, the occluded object 206 can be blocked from a camera (e.g., camera(s) 106) or another sensor (e.g., sensor(s) 107) of vehicle 202. For example, the other sensors can include radar, LiDAR, or a range sensor and the occluded object 206 can essentially be shielded from these sensors by the parked cars 204. Likewise, the occluded object 206 may not be visible in one or more images captured by the vehicle camera because it can be blocked by one or more parked cars 204. Because the occluded object 204 itself may not be detectable by vehicle 202, a dangerous situation can arise if the occluded object 204 moves into the path of vehicle travel with little time for vehicle 202 to react by slowing down or coming to a stop, which can cause a collision.

In some examples, although occluded object 206 may not be detectable by vehicle 202, a shadow 208 of the occluded object can be visible to the vehicle's camera. Based on detecting the shadow 208 in one or more captured images and detecting (e.g., using onboard computer 110) that the shadow is moving towards the direction of travel of the vehicle 202, the vehicle can reduce its speed or stop to allow extra time to react should occluded object 206 enter the vehicle's intended path of travel, for example. In some examples, detecting movement of shadow 208 can cause the vehicle 202 to reduce its speed or stop when the occluded object 206 is moving towards the vehicle. However, if the shadow 208 is not moving, which can be indicative of a stationary object such as a fire hydrant or parked motorcycle, or is moving away from the direction of vehicle 202 travel, the vehicle may continue to drive without reducing its speed or stopping. In some examples, while operating in the shadow detection mode, the vehicle 202 can employ other techniques to detect an occluded object. For example, one or more cameras of the vehicle can capture an image of the occluded object 206 through a window of a parked car 204 or a radar can detect the occluded object if the radar waves bounce beneath the parked cars 204. Other additional techniques of detecting occluded object 206 in conjunction with the shadow-detection mode are possible and multiple techniques can be used at once to increase the changes of detecting occluded object 206.

FIG. 2B illustrates an exemplary method 250 of detecting an occluded object during a fully or partially autonomous driving mode of a vehicle according to examples of the disclosure. While driving in a fully or partially autonomous driving mode, the vehicle (e.g., vehicle 202) can determine its location using GPS 108 and/or map information 105, for example (step 252 of method 250). In accordance with a determination that the vehicle is in a location where pedestrians or other hazards may enter the vehicle's direction of travel, the vehicle can enter a shadow-detection mode of driving and method 250 can proceed. For example, the vehicle can enter the shadow-detection mode and method 250 can proceed when the vehicle is in a "pedestrian-heavy zone" such as a parking lot, in a city, in a neighborhood, or in a school zone. While the vehicle is driving, a camera of the vehicle can capture one or more images of the vehicle's surroundings (step 254 of method 250). One or more shadows on the ground in the one or more captured images can be detected (e.g., by onboard computer 110) (step 256 of method 250). Exemplary details for detecting one or more shadows will be described with reference to FIGS. 3A-3C. The vehicle can further determine if the detected shadows are moving towards the direction of vehicle travel (step 258 of method 250). If the detected shadow is not moving towards the direction of vehicle travel (e.g., the shadow is stationary or moving away from the direction of vehicle travel), method 250 can start over at step 252, for example. If the detected shadow is moving towards the direction of vehicle travel, the vehicle can reduce its speed or stop (step 260 of method 250).

Figure 3A:
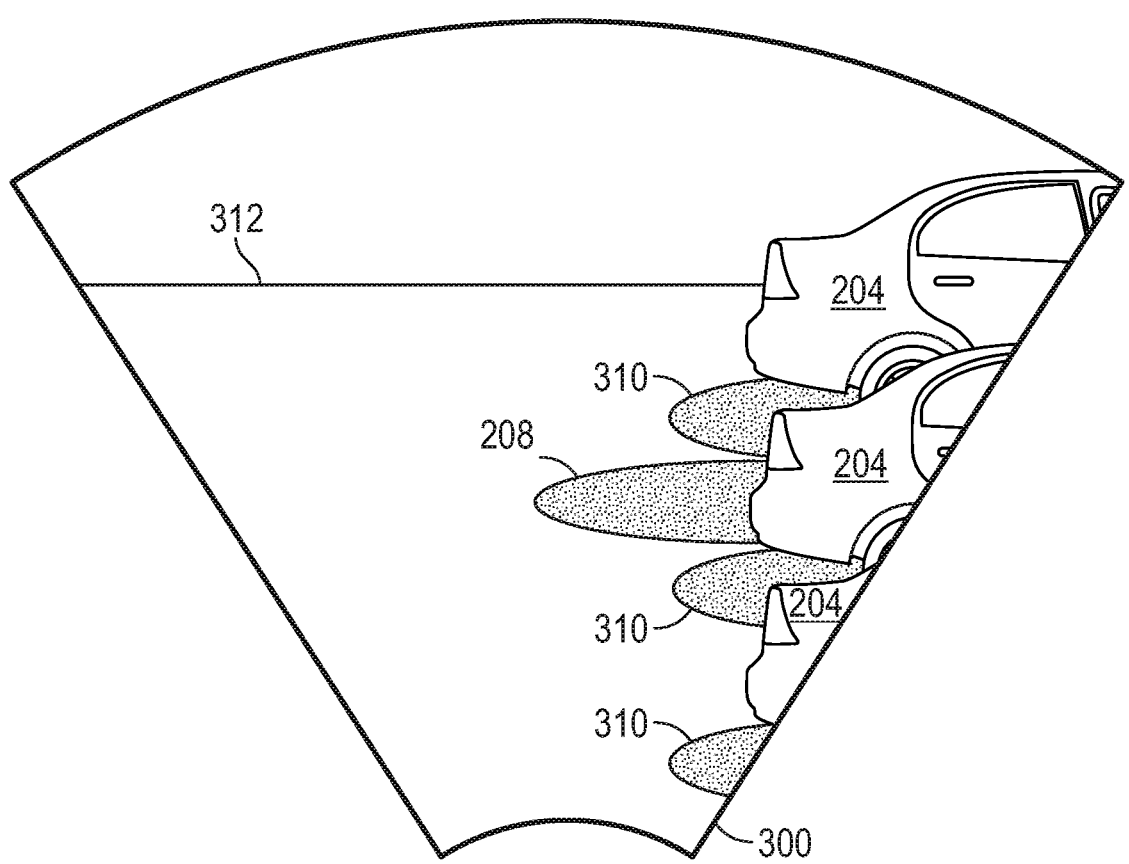
FIG. 3A illustrates an exemplary image captured by a camera of vehicle including a shadow of an occluded object according to examples of the disclosure.

FIG. 3A illustrates an exemplary image 300 captured by a camera of vehicle 202 including a shadow 208 of an occluded object 206 according to examples of the disclosure. Image 300 can be captured by one or more cameras (e.g., camera(s) 106) of vehicle 202 and can further include parked cars 204, shadows 310 of the parked cars, and a horizon 312. The shadow 208 of the occluded object 206 can be identified using image segmentation, as described in further detail with reference to FIG. 3B, and/or using a learning method, as described in further detail with reference to FIG. 3C.

FIG. 3B illustrates an exemplary method 350 of identifying a shadow 208 of occluded object 206 using image segmentation according to examples of the disclosure. Method 350 can be performed during a shadow detection mode of the vehicle 202 in accordance with a determination that the vehicle 202 is in a pedestrian-heavy zone, for example. In some examples, vehicle 202 can identify one or more pixels of image 300 that capture the ground (step 352 of method 350). For example, the vehicle 202 can identify pixels of image 300 that correspond to objects not on the ground, such as parked cars 204 and pixels above the horizon 312 (e.g., corresponding to the sky, buildings, or traffic lights). In some examples, vehicle 202 can detect parked cars 204 and any other objects using one or more of ultrasonic sensors, radar sensors, LiDAR sensors, and/or range sensors. The detected objects can be associated with one or more pixels of captured image 300, for example. In some examples, the vehicle 202 can estimate the position of the horizon 312 based on a calibration procedure or a different horizon detection algorithm. Accordingly, by process of elimination, the ground pixels can be identified.

The vehicle 202 can further segment the ground pixels into regions based on brightness (step 354 of method 350). For example, pixels proximate to one another having a darkness that is within a threshold difference of one another can form a segment. Variations in darkness in the image can be caused by discolorations of the ground, writing or lane markings on the ground, and/or shadows (e.g., shadow 208 or shadows 310).

In some examples, the vehicle 202 can identify a difference in darkness (black level and/or contrast) of each region compared to the surrounding regions (step 356 of method 350). For example, the shadow 208 of the occluded object 206 can have a first darkness and one or more regions surrounding it can have, on average, a second darkness, less than the first darkness by at least a threshold difference. The vehicle 202 can identify one or more "dark" regions surrounded by "light" regions as possibly corresponding to shadows.

Next, the vehicle 202 can determine whether the dark regions are moving (step 358 of method 350). Detecting which dark regions are moving can eliminate dark regions corresponding to shadows of stationary objects (e.g., shadows 310 of parked cars 204) and dark regions not corresponding to shadows (e.g., a puddle or another dark spot on the ground). In some examples, determining whether the dark regions are moving can be limited to detecting which dark regions are moving towards the path of vehicle 202 travel.

Optionally, vehicle 202 can compare the shape of the dark moving regions to one or more expected shadow shapes (step 360 of method 350). In some examples, step 360 can include one or more steps of method 370 described below with reference to FIG. 3C. Vehicle 202 can store (e.g., within onboard computer 110) one or more reference images corresponding to various shadows of people, pets, and other moving objects in a variety of lighting conditions to use for the comparison, for example.

In some examples, vehicle 202 can identify, using method 350, one or more shadows 208 of occluded objects 206 that are moving towards the direction of vehicle travel (step 362 of method 350). In response to detecting one or more shadows of occluded objects moving towards the direction of vehicle travel, the vehicle 202 can reduce its speed and/or come to a stop to allow more time to avoid the occluded object, should it enter the road.

It should be appreciated that in some embodiments a learning algorithm can be implemented such as a neural network (deep or shallow, which may employ a residual learning framework) and be applied instead of, or in conjunction with, another algorithm described herein to create additional modes or to improve the above-described modes and/or transitions between modes. Such learning algorithms may implement a feedforward neural network (e.g., a convolutional neural network) and/or a recurrent neural network, with structured learning, unstructured learning, and/or reinforcement learning. In some embodiments, backpropagation may be implemented (e.g., by implementing a supervised long short-term memory recurrent neural network, or a max-pooling convolutional neural network which may run on a graphics processing unit). Moreover, in some embodiments, unstructured learning methods may be used to improve structured learning methods. Moreover still, in some embodiments, resources such as energy and time may be saved by including spiking neurons in a neural network (e.g., neurons in a neural network that do not fire at each propagation cycle).

FIG. 3C illustrates an exemplary method 370 of identifying a shadow 208 of occluded object 206 using a learning algorithm according to examples of the disclosure. In some examples, method 370 can be performed in addition or as an alternative to method 350 described above with reference to FIG. 3B. In some examples, one or more steps of method 350 can be combined with one or more steps of method 370.

Vehicle 202 can collect example images to form a training data set (step 372 of method 370). In some examples, the example images can be captured by one or more cameras (e.g., camera(s) 106) of vehicle 202. Additionally or alternatively, one or more example images can be uploaded to an onboard computer (e.g., onboard computer 110) of vehicle 202 from a different camera. The images can include still images and/or videos captured in pedestrian-heavy zones such as parking lots, cities, school zones, neighborhoods, and other locations and scenarios where an occluded object may suddenly enter the path of vehicle travel.

In some examples, the example shadows of moving objects can be segmented in the example images (step 374 of method 370). Step 374 can include segmenting the example images manually or using one or more steps of method 350 described above with reference to FIG. 3B to automatically segment the images, for example. In some examples, vehicle 202 can store (e.g., using onboard computer 110) the segmented example images.

Next, vehicle 202 can train a classifier to detect shadows of moving objects (e.g., such as shadow 208 of occluded object 206) using the segmented example images (step 376 of method 370). In some examples, vehicle 202 can train the classifier using a learning algorithm, such as a Convolutional Neural Network algorithm.

In some examples, steps 372-376 can be part of a vehicle setup procedure performed at a dealership or factory. Additionally or alternatively, steps 372-376 can be performed multiple times while the vehicle 202 is parked and/or while the vehicle 202 is in use. In some examples, vehicle 202 can use a wireless connection to receive one or more segmented or unsegmented example images from a server and/or another vehicle to train the classifier to identify shadows of occluded objects (e.g., shadow 208 of occluded object 206).

The classifier can be trained multiple times or on an ongoing basis as new example images become available to the vehicle 202.

While the vehicle 202 is driving and capturing one or more still or video images (e.g., image 300), the classifier can be applied to the images to identify moving shadows (step 378 of process 370). For example, the classifier can associate one or more characteristics of the moving shadows in the training data set with a moving shadow and identify a moving shadow (step 380 of method 370) in a captured image based on identifying one or more of the characteristics in the captured image.

In some examples, vehicle 202 can perform method 350 and/or 370 while operating in a shadow detection mode. One or more steps of method 350 and method 370 can be combined. In some examples, steps of method 350 and/or method 370 can be repeated, alternated, performed in any order, and/or skipped.

Thus, examples of the disclosure provide various ways a vehicle can detect an occluded object based on the shadow of the occluded object while driving in an autonomous driving me, allowing the vehicle to reduce its speed to avoid a collision should the object enter the vehicle's path of travel.

Therefore, according to the above, some examples of the disclosure are related to a vehicle comprising: one or more cameras; one or more actuator systems; and a processor operatively coupled to the one or more cameras and the one or more actuator systems, the processor configured to: identify a shadow in one or more images captured by the one or more cameras; determine whether the shadow is moving in a direction towards a direction of vehicle travel; and in accordance with a determination that the shadow is moving in a direction towards the direction of vehicle travel, reducing a speed of the vehicle using the one or more actuator systems. Additionally or alternatively, in some examples, the vehicle comprises a location system and a map interface, wherein the processor is operatively coupled to the location system and the map interface, and the processor is further configured to: identify a location of the vehicle based on one or more of the location system and the map interface; and based on a determination that the vehicle location is in a pedestrian heavy zone, enter a shadow detection mode, wherein the shadow detection mode causes the processor to identify the shadow and determine whether the shadow is moving. Additionally or alternatively, in some examples, the shadow is a shadow of an occluded object and the occluded object is not included in the one or images captured by the one or more cameras of the vehicle. Additionally or alternatively, in some examples, the processor is further configured to, in accordance with a determination that the shadow is stationary or moving in a direction away from the direction of vehicle travel, maintain the speed of the vehicle using the one or more actuator systems. Additionally or alternatively, in some examples, identifying the shadow in the one or more images comprises: segmenting a plurality of pixels of the one or more images into groups based on a darkness of each pixel, wherein pixels within each group have darknesses within a first threshold difference of each other; and identifying a plurality of dark pixels having a first darkness surrounded by a plurality of light pixels having a second darkness, the first darkness darker than the second darkness by at least a second threshold difference. Additionally or alternatively, in some examples, the vehicle further comprises one or more of a LiDAR sensor, an ultrasonic sensor, a radar sensor, and a range sensor, wherein identifying the shadow in the one or more images comprises: identifying a plurality of pixels of the one or more images illustrating an image of a ground based on data from the one or more of the LiDAR sensor, the ultrasonic sensor, the radar sensor, and the range sensor; and identifying the shadow within the pixels illustrating the image of the ground. Additionally or alternatively, in some examples, identifying the shadow in the one or more images comprises comparing the shadow to an expected shadow shape. Additionally or alternatively, in some examples, identifying the shadow in the one or more images comprises: collecting a plurality of example images; segmenting a plurality of example shadows in the plurality of example images; training a classifier using the plurality of example images; and applying the classifier to the one or more images.

Some examples of the disclosure are related to a method of operating a vehicle in an autonomous driving mode, the method comprising: capturing one or more images at one or more cameras of the vehicle; identifying a shadow in the one or more images; determining whether the shadow is moving in a direction towards a direction of vehicle travel; and in accordance with a determination that the shadow is moving in a direction towards the direction of vehicle travel, reducing a speed of the vehicle using one or more actuator systems of the vehicle. Additionally or alternatively, in some examples, the method further comprises identifying a location of the vehicle based on one or more of a location system and a map interface of the vehicle; and based on a determination that the vehicle location is in a pedestrian heavy zone, entering a shadow detection mode, wherein the shadow detection mode causes the processor to identify the shadow and determine whether the shadow is moving. Additionally or alternatively, in some examples, the shadow is a shadow of an occluded object and the occluded object is not included in the one or images captured by the one or more cameras of the vehicle. Additionally or alternatively, in some examples, the method further comprises, in accordance with a determination that the shadow is stationary or moving in a direction away from the direction of vehicle travel, maintaining the speed of the vehicle using the one or more actuator systems. Additionally or alternatively, in some examples, the method further comprises segmenting a plurality of pixels of the one or more images into groups based on a darkness of each pixel, wherein pixels within each group have darknesses within a first threshold difference of each other; and identifying a plurality of dark pixels having a first darkness surrounded by a plurality of light pixels having a second darkness, the first darkness darker than the second darkness by at least a second threshold difference. Additionally or alternatively, in some examples, the method further comprises identifying a plurality of pixels of the one or more images illustrating an image of a ground based on data from one or more of a LiDAR sensor, an ultrasonic sensor, a radar sensor, and a range sensor included in the vehicle; and identifying the shadow within the pixels illustrating the image of the ground. Additionally or alternatively, in some examples, the method further comprises comparing the shadow to an expected shadow shape. Additionally or alternatively, in some examples, the method further comprises collecting a plurality of example images; segmenting a plurality of example shadows in the plurality of example images; training a classifier using the plurality of example images; and applying the classifier to the one or more images.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A vehicle comprising:
   one or more cameras;
   one or more actuator systems; and
   a processor operatively coupled to the one or more cameras and the one or more actuator systems, the processor configured to:
      identify a shadow in one or more images captured by the one or more cameras;
      determine whether the shadow is moving into a path of the vehicle; and
      in accordance with a determination that the shadow is moving into a path of the vehicle, reducing a speed of the vehicle using the one or more actuator systems;
   wherein identifying the shadow in the one or more images comprises:
      segmenting a plurality of pixels of the one or more images into groups based on a darkness of each pixel, wherein pixels within each group have darknesses within a first threshold difference of each other; and
      identifying one of the groups having a plurality of dark pixels having a first darkness surrounded by one of the groups having a plurality of light pixels having a second darkness, the first darkness darker than the second darkness by at least a second threshold difference.

2. The vehicle of claim 1, further comprising a location system and a map interface, wherein the processor is operatively coupled to the location system and the map interface, and the processor is further configured to:
   identify a location of the vehicle based on one or more of the location system and the map interface; and
   based on a determination that the vehicle location is in a pedestrian zone, enter a shadow detection mode, wherein the shadow detection mode causes the processor to identify the shadow and determine whether the shadow is moving.

3. The vehicle of claim 1, wherein the processor is further configured to determine that the shadow is a shadow of an occluded object and the occluded object is not included in the one or more images captured by the one or more cameras of the vehicle.

4. The vehicle of claim 1, wherein the processor is further configured to, in accordance with a determination that the shadow is stationary or moving in a direction away from the direction of vehicle travel, maintain the speed of the vehicle using the one or more actuator systems.

5. The vehicle of claim 1, further comprising one or more of a LiDAR sensor, an ultrasonic sensor, a radar sensor, and a range sensor, wherein identifying the shadow in the one or more images comprises:
   identifying a plurality of pixels of the one or more images illustrating an image of a ground based on data from the one or more of the LiDAR sensor, the ultrasonic sensor, the radar sensor, and the range sensor; and
   identifying the shadow within the pixels illustrating the image of the ground.

6. The vehicle of claim 1, wherein identifying the shadow in the one or more images comprises comparing the shadow to an expected shadow shape.

7. The vehicle of claim 1, wherein identifying the shadow in the one or more images comprises:
   collecting a plurality of example images;
   segmenting a plurality of example shadows in the plurality of example images;
   training a classifier using the plurality of example images; and
   applying the classifier to the one or more images.

8. A method of operating a vehicle in an autonomous driving mode, the method comprising:
   capturing one or more images at one or more cameras of the vehicle;
   identifying a shadow in the one or more images;
   determining whether the shadow is moving into a path of the vehicle;
   in accordance with a determination that the shadow is moving into a path of the vehicle, reducing a speed of the vehicle using one or more actuator systems of the vehicle;
   segmenting a plurality of pixels of the one or more images into groups based on a darkness of each pixel, wherein pixels within each group have darknesses within a first threshold difference of each other; and
   identifying one of the groups having a plurality of dark pixels having a first darkness surrounded by one of the groups having a plurality of light pixels having a second darkness, the first darkness darker than the second darkness by at least a second threshold difference.

9. The method of claim 8, further comprising:
   identifying a location of the vehicle based on one or more of a location system and a map interface of the vehicle; and
   based on a determination that the vehicle location is in a pedestrian zone, entering a shadow detection mode, wherein the shadow detection mode causes the processor to identify the shadow and determine whether the shadow is moving.

10. The method of claim 8, further comprises determining that the shadow is a shadow of an occluded object and the occluded object is not included in the one or more images captured by the one or more cameras of the vehicle.

11. The method of claim 8, further comprising: in accordance with a determination that the shadow is stationary or moving in a direction away from the direction of vehicle travel, maintaining the speed of the vehicle using the one or more actuator systems.

12. The method of claim 8, further comprising:
   identifying a plurality of pixels of the one or more images illustrating an image of a ground based on data from one or more of a LiDAR sensor, an ultrasonic sensor, a radar sensor, and a range sensor included in the vehicle; and
   identifying the shadow within the pixels illustrating the image of the ground.

13. The method of claim 8, further comprising comparing the shadow to an expected shadow shape.

14. The method of claim 8, further comprising:
   collecting a plurality of example images;
   segmenting a plurality of example shadows in the plurality of example images;
   training a classifier using the plurality of example images; and applying the classifier to the one or more images.

* * * * *